United States Patent
Zhang et al.

(10) Patent No.: US 10,031,673 B2
(45) Date of Patent: Jul. 24, 2018

(54) TECHNIQUES FOR SELECTING AMOUNTS OF OVER-PROVISIONING

(71) Applicant: SK hynix Inc., Gyeonggi-do (KR)

(72) Inventors: Yan Zhang, Milpitas, CA (US); Fan Zhang, Fremont, CA (US)

(73) Assignee: SK Hynix Inc., Gyeonggi-do (KR)

( * ) Notice: Subject to any disclaimer, the term of this patent is extended or adjusted under 35 U.S.C. 154(b) by 300 days.

(21) Appl. No.: 14/850,587

(22) Filed: Sep. 10, 2015

(65) Prior Publication Data

US 2016/0092114 A1   Mar. 31, 2016

Related U.S. Application Data (60) Provisional application No. 62/056,292, filed on Sep. 26, 2014.

(51) Int. Cl.
 *G06F 3/06* (2006.01)

(52) U.S. Cl.
 CPC .......... *G06F 3/0608* (2013.01); *G06F 3/0631* (2013.01); *G06F 3/0679* (2013.01)

(58) Field of Classification Search
 CPC ..... G06F 3/0608; G06F 3/0679; G06F 3/0653
 See application file for complete search history.

(56) References Cited

U.S. PATENT DOCUMENTS

| | | | |
|---|---|---|---|
| 8,479,080 B1 * | 7/2013 | Shalvi ..................... | G06F 11/10 365/185.09 |
| 2007/0061502 A1 * | 3/2007 | Lasser ................. | G06F 12/0246 711/103 |
| 2012/0240012 A1 * | 9/2012 | Weathers ............ | G06F 11/1072 714/773 |
| 2013/0061019 A1 * | 3/2013 | Fitzpatrick .......... | G06F 11/3485 711/173 |
| 2013/0124945 A1 * | 5/2013 | Hu ........................ | H03M 13/13 714/773 |
| 2014/0101379 A1 | 4/2014 | Tomlin | |

\* cited by examiner

*Primary Examiner* — Larry T Mackall
(74) *Attorney, Agent, or Firm* — IP & T Group LLP (57) ABSTRACT

A cost function is obtained where an amount of over-provisioning associated with solid state storage is an input of the cost function and a cost for a given amount of over-provisioning is an output of the cost function. An amount of over-provisioning is determined using the cost function and the amount of over-provisioning for the solid state storage is set to be the determined amount.

18 Claims, 10 Drawing Sheets

TECHNIQUES FOR SELECTING AMOUNTS OF OVER-PROVISIONING

CROSS REFERENCE TO OTHER APPLICATIONS

This application claims priority to U.S. Provisional Patent Application No. 62/056,292 entitled COST EFFECTIVE OVER-PROVISIONING ADJUSTMENT SCHEME filed Sep. 26, 2014 which is incorporated herein by reference for all purposes.

BACKGROUND OF THE INVENTION

Over-provisioning is a feature in storage systems where the amount of actual or physical storage exceeds some advertised amount of storage or user logical space. For example, a storage drive may be advertised to have 1 MB of storage, or the user can read from or write to 1 MB's worth of logical addresses, but the amount of actual or physical storage is greater than 1 MB. In one example, the amount of over-provisioning may be calculated as:

$$op(t) = \frac{s(t)}{u} \times 100\% \quad (1)$$

where op(t) is the amount of over-provisioning (in percentage) at time t, s(t) is the amount of spare space (i.e., over-provisioning) at time t (e.g., since blocks may go bad with wear), and u is the amount of user (logical) space (e.g., the advertised amount of space). For example, with a storage system with 1 MB of advertised storage space (i.e., u=1 MB), 7% of over-provisioning would have 70 KB of spare space (i.e., s=70 KB) for a total of 1.07 MB actual or physical storage (i.e., u+s=1.07 MB).

New techniques which better select and/or adjust the amount of over-provisioning would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A variety of techniques for determining amounts of over-provisioning are described herein. First, some examples of a technique which determine an amount of over-provisioning based on a write amplification function and a cost function are described. Then, some examples of a technique which determine an amount of over-provisioning based at least in part on a threshold amount of over-provisioning at an age of interest are described.

Figure 1:
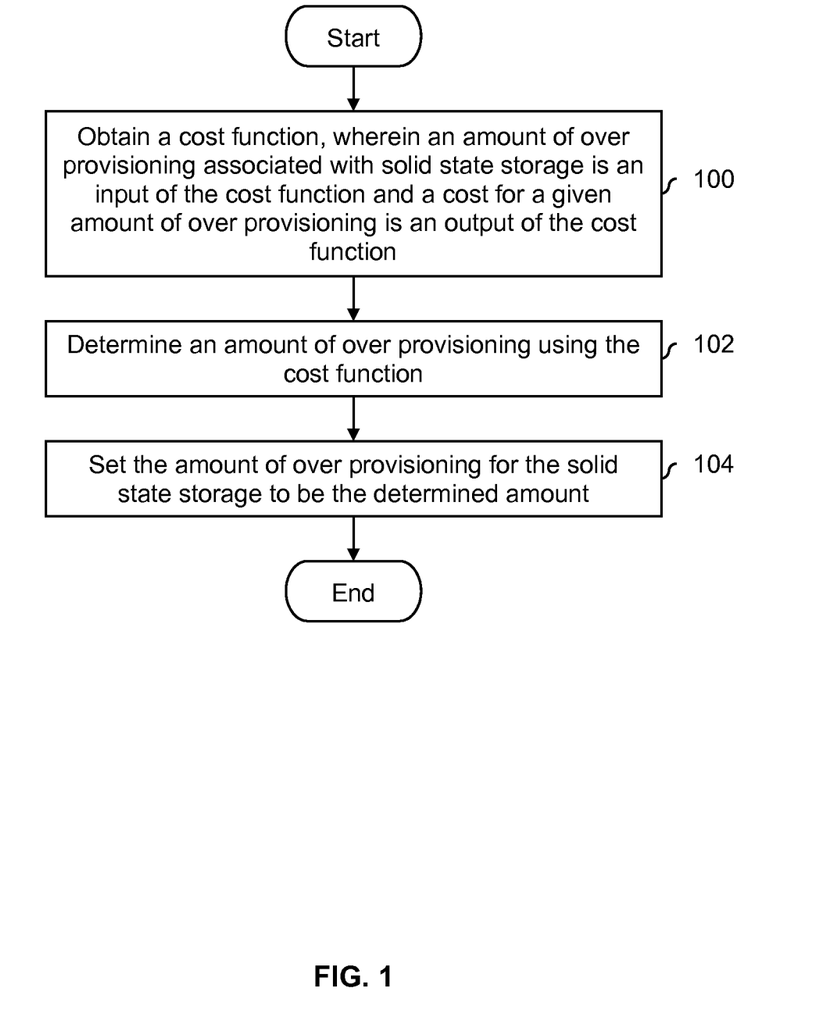
FIG. 1 is a flowchart illustrating an embodiment of a process to determine an amount of over-provisioning using a cost function.

FIG. 1 is a flowchart illustrating an embodiment of a process to determine an amount of over-provisioning using a cost function. In some embodiments, the process of FIG. 1 is used to adjust the amount of over-provisioning in the middle of a solid state storage system's lifecycle (e.g., when there is already user data, overhead data (such as metadata), and/or other information stored on the solid state storage drive or media). In some embodiments, the process of FIG. 1 is performed at the beginning of the lifecycle of a solid state storage drive, for example when designing a storage system.

At 100, a cost function is obtained, wherein an amount of over-provisioning associated with solid state storage is an input of the cost function and a cost for a given amount of over-provisioning is an output of the cost function. The cost which is outputted by the cost function may be expressed in a variety of units. In some embodiments described herein, the cost relates to the amount of total storage (e.g., over-provisioning plus user space) where the user space is the baseline and is associated with a cost of 1. For example, for 10% over-provisioning, the corresponding output cost (in such embodiments) would be 1.1. In some embodiments, such a cost function is desirable because it is easy to obtain and/or easy to work with.

At 102, an amount of over-provisioning is determined using the cost function. In some examples described in more detail below, this includes multiplying the cost function with another function and finding the amount of over-provisioning which corresponds to the minimum of the combined function. In some embodiments, the system is configured to have the amount of over-provisioning which corresponds to the minimum of the combined function. In some embodiments, some amount of over-provisioning near the amount of over-provisioning which corresponds to the minimum of the combined function is used instead.

At 104, the amount of over-provisioning for the solid state storage is set to be the determined amount. For example, some component or block in a solid state storage controller, which manages and/or tracks what physical addresses correspond to the over provisioned storage and what physical addresses correspond to the user space is updated accordingly. If needed, already-stored information is moved to another physical location before being re-allocated or otherwise re-assigned from over provisioned storage to user space, or vice versa.

Some other techniques may select an amount of over-provisioning arbitrarily or for historic reasons (e.g., a certain amount of over-provisioning has always been used). Using a cost function is a more rational and data-driven way to determine how much over-provisioning to have which (as an example) weighs the benefits of more over-provisioning (e.g., less write amplification, which is described in more detail below) against the additional cost of more over-provisioning.

The following figure illustrates an example of a system which performs the process of FIG. 1.

Figure 2:
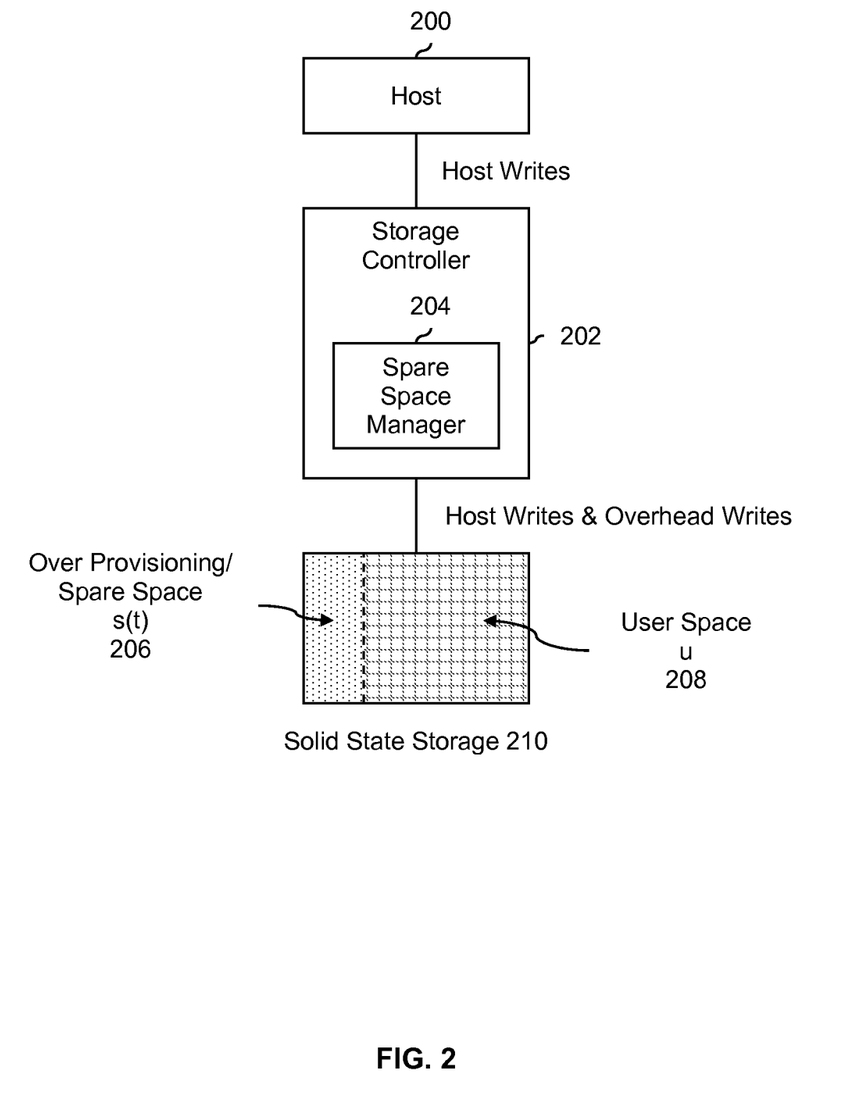
FIG. 2 is a diagram illustrating an embodiment of a solid state storage system which determines an amount of over-provisioning based on cost.

FIG. 2 is a diagram illustrating an embodiment of a solid state storage system which determines an amount of over-provisioning based on cost. In the example shown, spare space manager 204 determines (e.g., during the lifecycle of the storage system shown) how much spare space 206 (that is, over-provisioning) to have. Naturally, the amount of spare space 206 determined affects the amount of user space 208. In some other embodiments (e.g., where the process of FIG. 1 is being performed at the beginning of a storage system's lifecycle), the process may be performed externally by some device other than spare space manager 204 (such as a processor which is external to the storage system shown in FIG. 2) and solid state storage 210 may be manufactured and/or configured accordingly.

Solid state storage 210 is divided up into two portions: spare space 206 and user space 208. The size of user space 208 corresponds to an advertised or addressable amount of user logical space. Spare space 206 corresponds to extra storage that may be unadvertised capacity. For example, from Equation (1) above, if user space 208 corresponds to 1 MB of storage and spare space 206 corresponds to 70 KB of storage, then solid state storage 210 has 7% over-provisioning.

In this particular example, spare space 206 is used to implement a cache. In order for a cache implemented in spare space 206 to have a faster read time than user space 208, spare space 206 is configured to have fewer bits per cell than user space 208. For example, spare space 206 may be implemented as single-level cells (SLC) with 1 bit per cell and user space 208 may be implemented as multi-level cells (MLC) with 2 bits per cell. Naturally, other types of cells may be used such as tri-level cells (TLC), quad-level cells (QLC), etc. It is also not required that spare space 206 be implemented as SLC, just that the bit density be lower than that of user space 208 (since cells which store fewer bits are able to be read back faster than cells with more bits). For example, a cache implemented in spare space 206 may be in MLC and user space 208 may be in TLC.

In this particular example, solid state storage 210 is configurable as to which physical addresses are SLC versus MLC. For example, solid state storage 210 may expose some interface or registers via which the bit density of specified physical addresses is able to be programmed (e.g., set <address range> to <number of bits per cell>).

In some embodiments, an amount of over-provisioning is adjusted by adjusting the bit density of spare space 206. In one example where at least some of spare space 206 is implemented using MLC, if it is decided to decrease the amount of over-provisioning, at least some of the MLC spare space is changed from MLC to SLC. Similarly, the amount of storage in spare space 206 may be increased by changing some SLC spare space to MLC spare space. It is noted that it may not be necessary for spare space 206 to be all MLC or all SLC. That is, spare space 206 may include some SLC and some MLC (as an example).

In some embodiments, solid state storage 210 is configurable as to which physical addresses comprise spare space 206 versus user space 208. Alternatively, spare space manager 204 or some other address tracker or manager (e.g., a logical to physical address mapping table) may track which physical addresses correspond to the spare space (which possibly includes a cache) versus the user space.

Write amplification is a metric of particular interest to solid state storage systems. That is, write amplification is not of interest to hard disk drive (HDD) storage or other types of storage because it is not relevant to non-solid state storage systems. Write amplification equals $$\frac{\text{(host writes + overhead writes)}}{\text{host writes}}$$

where the numerator is observable between storage controller 202 and solid state storage 210 and the denominator is observable between host 200 and storage controller 202. The lower the write amplification value is, the less overhead there is (which is a desirable thing). The ideal or best write amplification value is 1 (i.e., when there are no overhead writes).

Returning to FIG. 1, in some embodiments, a write amplification function is obtained, where the write amplification function is used at step 102 to determine the amount of over-provisioning. The following figure shows an example of such a write amplification function.

Figure 3:
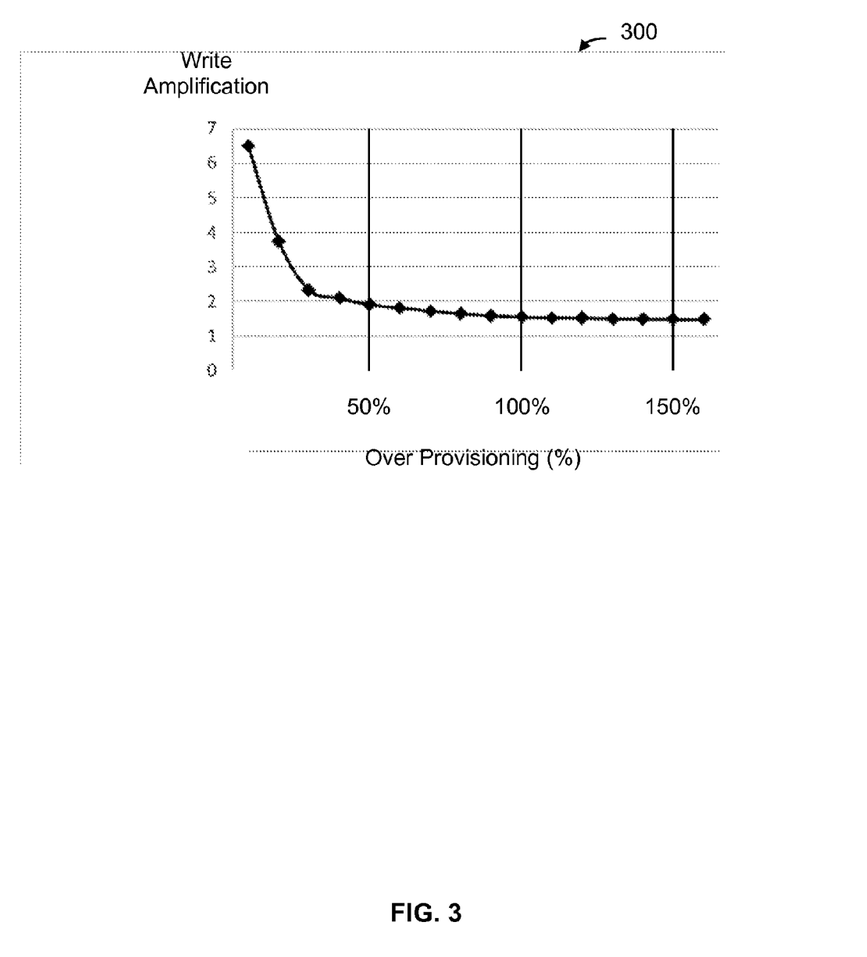
FIG. 3 is a diagram illustrating an embodiment of a write amplification function.

FIG. 3 is a diagram illustrating an embodiment of a write amplification function. In the example shown, the x-axis in diagram 300 corresponds to over-provisioning (in percentage) and the y-axis corresponds to write amplification. In this particular example, over-provisioning is expressed as a percentage; naturally, in some other embodiments, it may be expressed in bytes (e.g., KB, MB, etc.).

For readability, the data points that comprise the exemplary write amplification function shown in diagram 300 are shown in the table below.

TABLE 1

Data points in exemplary write amplification function (FIG. 3).

| Over-provisioning | Write Amplification |
|---|---|
| 10% | 6.5 |
| 20% | 3.8 |
| 30% | 2.3 |
| 40% | 2.1 |
| 50% | 1.9 |
| 60% | 1.8 |
| 70% | 1.7 |
| 80% | 1.7 |
| 90% | 1.6 |
| 100% | 1.6 |
| 110% | 1.5 |
| 120% | 1.5 |
| 130% | 1.5 |
| 140% | 1.5 |
| 150% | 1.5 |
| 160% | 1.5 |

As described above, write amplification is the ratio of host writes plus overhead writes (e.g., from garbage collection, wear leveling, etc.) compared against host writes. For example, an observer or counter between a host and a storage controller would observe host writes. An observer or counter between the storage controller and the solid state storage drive or media itself would observe hot writes plus overhead writes (such as garbage collection, which is initiated by the storage controller).

In some embodiments, a write amplification function is obtained through simulation or modeling. For example, model systems with various amounts of over-provisioning may be simulated to experience host traffic and the corresponding amounts of write amplification may be obtained. This may be useful when over-provisioning is being determined at the beginning of a storage system's lifecycle. In some embodiments, a write amplification function is from real-world systems in real-world environments. This may be useful when the amount of over-provisioning is being determined in the middle of a storage system's lifecycle. In some embodiments, some combination of techniques is used (e.g., obtain a few data points using real-world systems in real-world environments and use interpolation and/or extrapolation to obtain other data points or values).

In general form, write amplification may be expressed as:

$$wa(t)=g(op(t)) \quad (2)$$

where wa(t) is the write amplification at time t and op(t) is the over-provisioning at time t (e.g., blocks can go bad with wear over time, which would eat into the amount of spare blocks).

Generally speaking, the more over-provisioning, the smaller the write amplification. This is because garbage collection does not need to be performed as frequently since there are more extra and/or empty blocks when there is more over-provisioning. Thus, a write amplification function will (generally speaking) show that write amplification tends to go down as over-provisioning goes up.

Returning to FIG. 1, the exemplary write amplification function shown in FIG. 3 may be combined with a cost function at step 102. The following figure shows an exemplary cost function.

Figure 4:
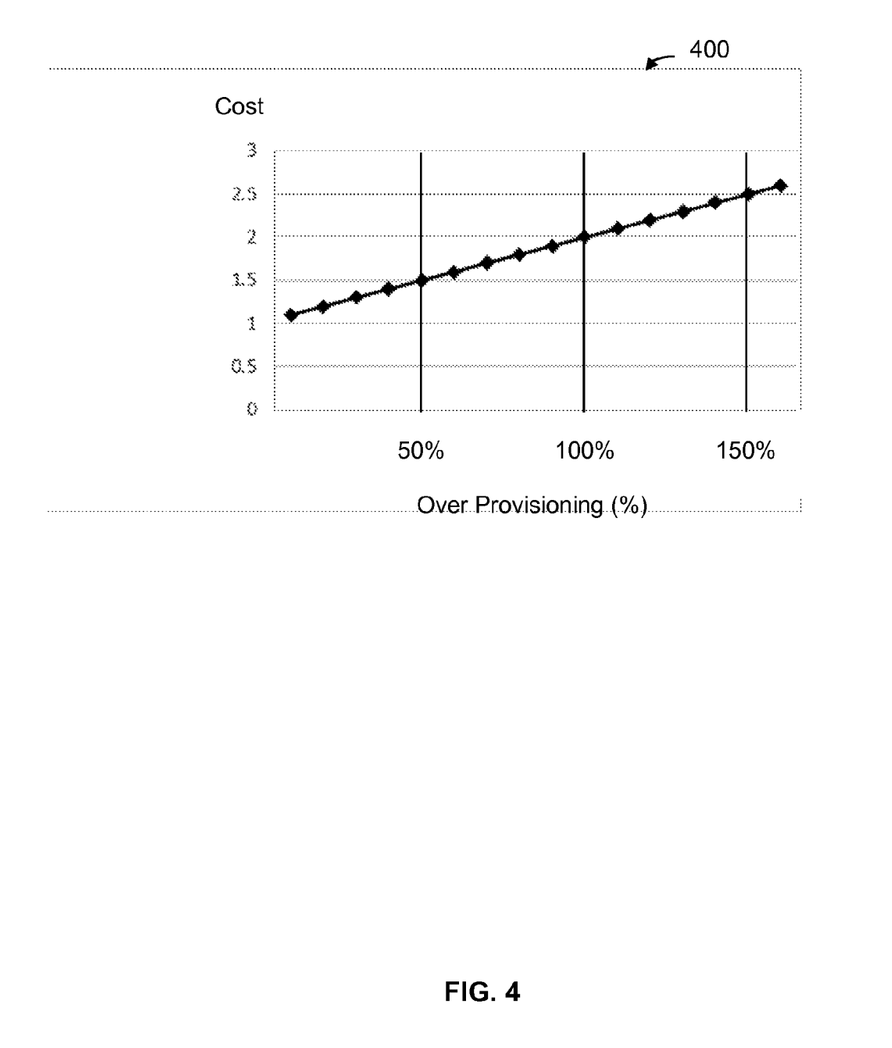
FIG. 4 is a diagram illustrating an embodiment of a cost function.

FIG. 4 is a diagram illustrating an embodiment of a cost function. In this example, the x-axis of diagram 400 corresponds to over-provisioning (in percentage) and the y-axis corresponds to a cost. Diagram 400 shows an example of a cost function that may be obtained at step 100 and used at step 102 in FIG. 1. In this particular example, the cost of user space u is defined to be 1. Thus, the cost of 10% over-provisioning is 1.1, the cost of 20% over-provisioning is 1.2, and so on.

For readability, the data points that comprise the exemplary cost function shown in diagram 400 are shown in the table below.

TABLE 2

Data points in exemplary cost function (FIG. 4).

| Over-provisioning | Cost |
|---|---|
| 10% | 1.1 |
| 20% | 1.2 |
| 30% | 1.3 |
| 40% | 1.4 |
| 50% | 1.5 |
| 60% | 1.6 |
| 70% | 1.7 |
| 80% | 1.8 |
| 90% | 1.9 |
| 100% | 2.0 |
| 110% | 2.1 |
| 120% | 2.2 |
| 130% | 2.3 |
| 140% | 2.4 |
| 150% | 2.5 |
| 160% | 2.6 |

The write amplification function shown in FIG. 3 and the cost function shown in FIG. 4 may be combined and used to determine an amount of over-provisioning at step 102 in FIG. 1. The following figure shows an example of such a combined function.

Figure 5:
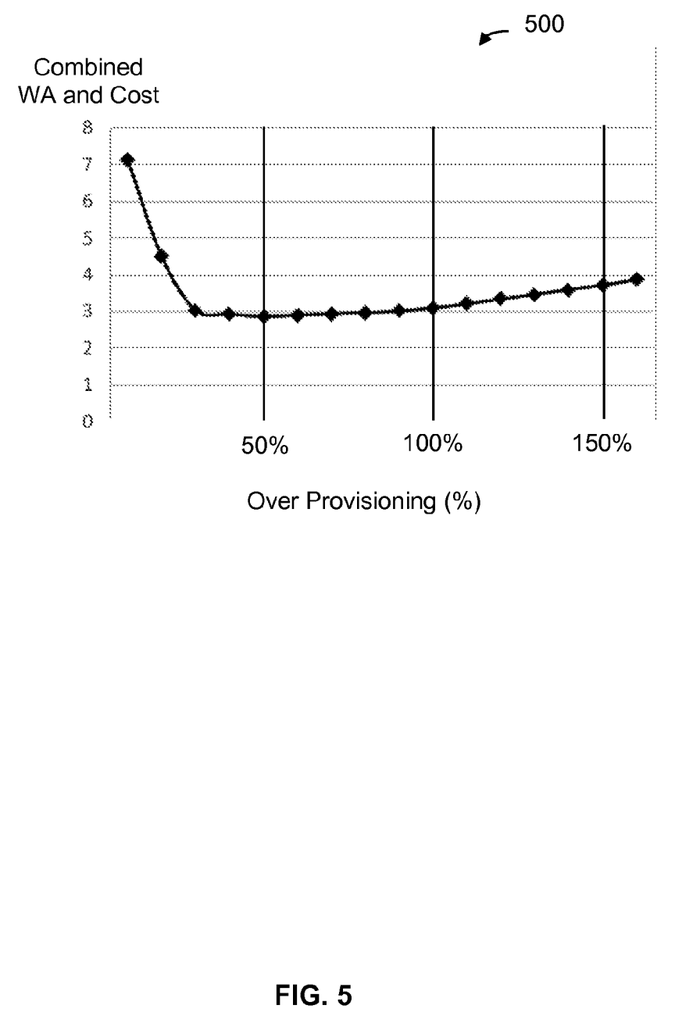
FIG. 5 is a diagram illustrating an embodiment of a combined write amplification and cost function.

FIG. 5 is a diagram illustrating an embodiment of a combined write amplification and cost function. The function shown in diagram 500 is obtained by multiplying the write amplification function shown in FIG. 3 with the cost function shown in FIG. 4. A combined write amplification and cost function is one example of an objective function which is used to determine an amount of over-provisioning. Although examples below discuss a combined write amplification and cost function, any objective function may be used.

For readability, the data points that comprise the exemplary combined function shown in diagram 500 are shown in the table below.

TABLE 3

Data points in exemplary combined function (FIG. 5).

| Over-provisioning | Combined WA and Cost |
|---|---|
| 10% | 7.15 |
| 20% | 4.56 |
| 30% | 2.99 |
| 40% | 2.94 |
| 50% | 2.85 |
| 60% | 2.88 |
| 70% | 2.89 |
| 80% | 3.06 |
| 90% | 3.04 |
| 100% | 3.20 |
| 110% | 3.15 |
| 120% | 3.30 |
| 130% | 3.45 |
| 140% | 3.60 |

TABLE 3-continued

Data points in exemplary combined function (FIG. 5).

| Over-provisioning | Combined WA and Cost |
|---|---|
| 150% | 3.75 |
| 160% | 3.90 |

In this particular example, the minimum of the combined function is first found. In this example, that corresponds to the data point (50%, 2.85). The amount of over-provisioning for which the combined function is a minimum is referred to herein as a minimum amount of over-provisioning (e.g., since the term "the amount of over-provisioning for which the combined function is a minimum" is unwieldy). In this example, the minimum amount of over-provisioning would be 50% since it corresponds to the lowest combined write amplification and cost.

In some embodiments, the over-provisioning is sized to the minimum amount of over-provisioning. In some embodiments, the minimum amount of over-provisioning is used to determine a range for acceptable amounts of over-provisioning, from which one is selected. An example of this is described in more detail below.

Figure 6:
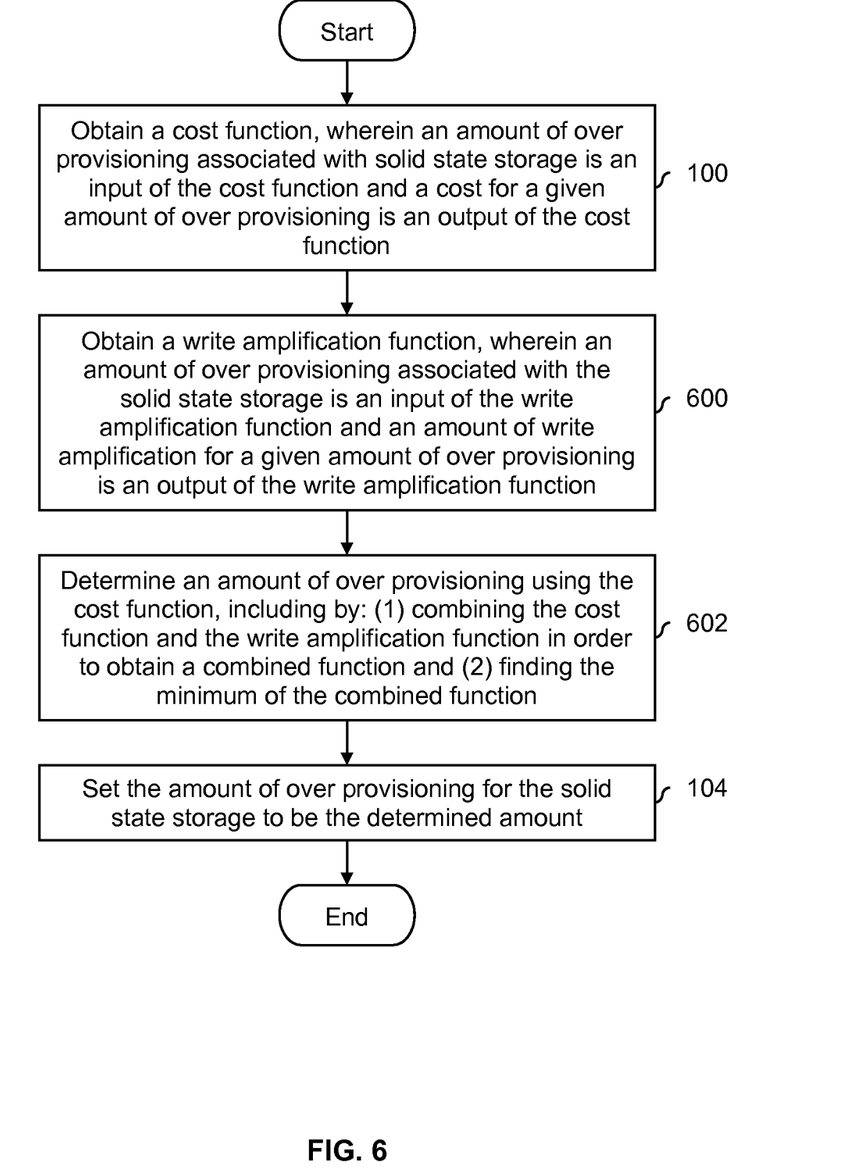
FIG. 6 is a flowchart illustrating an embodiment of a process to determine an amount of over-provisioning using a cost function and a write amplification function.

The following figure illustrates an embodiment of a process to determine an amount of over-provisioning using a cost function and a write amplification function.

FIG. 6 is a flowchart illustrating an embodiment of a process to determine an amount of over-provisioning using a cost function and a write amplification function. FIG. 6 is similar to FIG. 1 and the same reference numbers are used where steps are identical.

At 100, a cost function is obtained, wherein an amount of over-provisioning associated with solid state storage is an input of the cost function and a cost for a given amount of over-provisioning is an output of the cost function. See, for example, the cost function shown in FIG. 4.

At 600, a write amplification function is obtained, wherein an amount of over-provisioning associated with the solid state storage is an input of the write amplification function and an amount of write amplification for a given amount of over-provisioning is an output of the write amplification function. See, for example, the write amplification function shown in FIG. 3.

At 602, an amount of over-provisioning is determined using the cost function, including by: (1) combining the cost function and the write amplification function in order to obtain a combined function and (2) finding the minimum of the combined function. See, for example, the combined function shown in FIG. 5. In that example, the minimum of the wear function is 2.85, which corresponds to 50% over-provisioning.

At 104, the amount of over-provisioning for the solid state storage is set to be the determined amount. In some embodiments, the amount of over-provisioning is set to be the minimum amount of over-provisioning which corresponds to the minimum of the combined function found at step 602. Alternatively, the minimum amount of over-provisioning may be used to find a range of acceptable amounts of over-provisioning, and one is selected from that range. The following figure shows an example of this.

Figure 7:
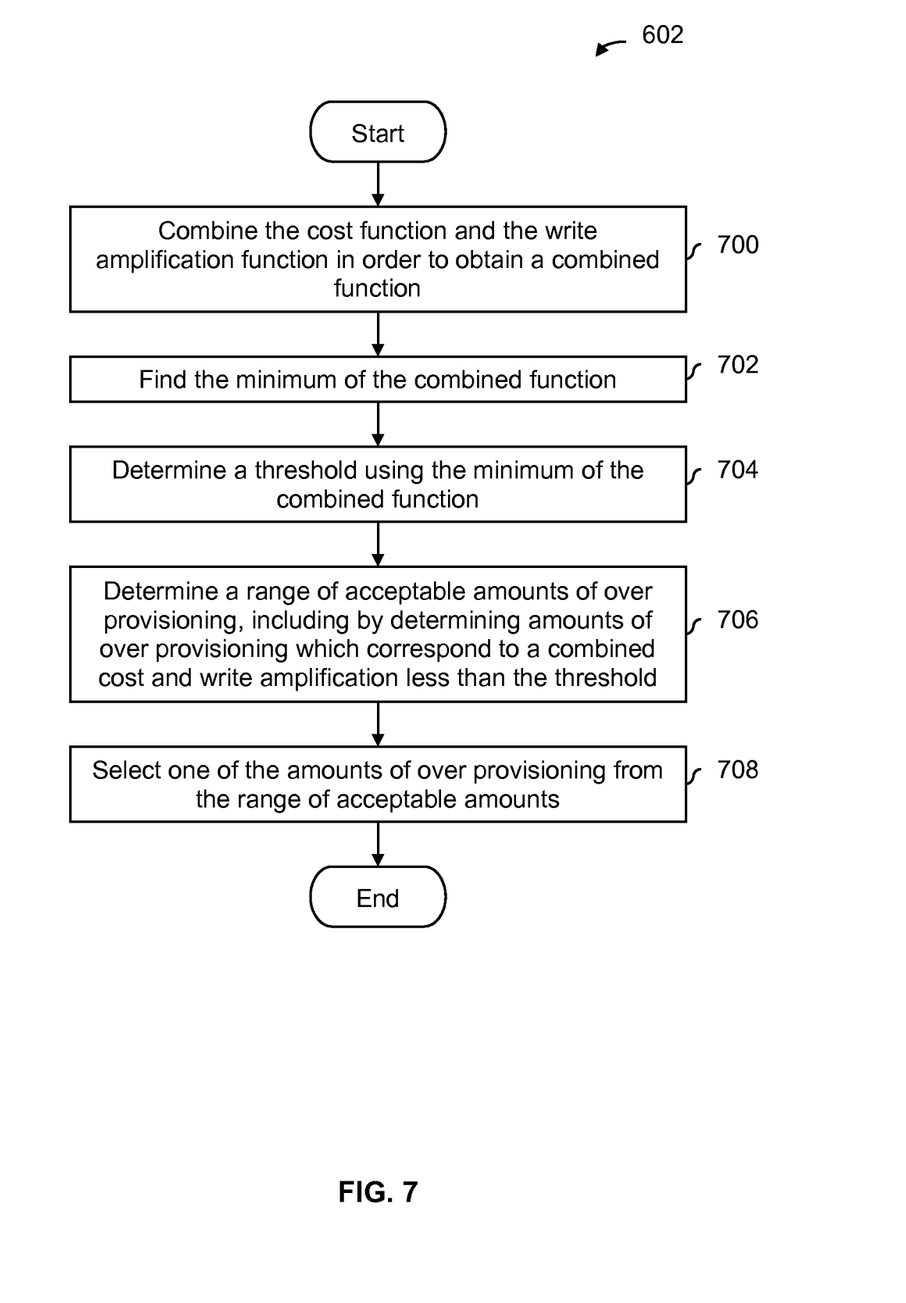
FIG. 7 is a flowchart illustrating an embodiment of a process to determine an amount of over-provisioning, including by finding a range of acceptable amounts of over-provisioning.

FIG. 7 is a flowchart illustrating an embodiment of a process to determine an amount of over-provisioning, including by finding a range of acceptable amounts of over-provisioning. In some embodiments, step 602 in FIG. 6 includes this process.

At 700, the cost function and the write amplification function are combined in order to obtain a combined function. At 702, the minimum of the combined function is found. For completeness, steps 700 and 702 are repeated herein even though they are already included in step 602 in FIG. 6.

At 704, a threshold is determined using the minimum of the combined function. In this example, a small value (i.e., $\delta$) is added to the minimum combined write amplification and cost value. In this example, that would be 2.85+$\delta$. If $\delta$=0.13 then the threshold is 2.85+0.13=2.98.

At 706, a range of acceptable amounts of over-provisioning is determined, including by determining amounts of over-provisioning which correspond to a combined cost and write amplification less than the threshold. For example, as Table 3 shows, the following data points have a combined cost and write amplification which is less than 3: (40%, 2.94), (50%, 2.85), (60%, 2.88), and (70%, 2.89). The range of acceptable amounts of over-provisioning in this particular example would be between 40% and 70%, inclusive.

At 708, one of the amounts of over-provisioning is selected from the range of acceptable amounts. For example, it may be desirable to select the lowest amount of over-provisioning from the range of acceptable amounts of over-provisioning, in this case 40%. In looking at FIG. 4, the cost rises linearly but the benefit of reduced write amplification in FIG. 3 flattens out, so it may be the best tradeoff to select the lowest amount of over-provisioning from the acceptable range.

Figure 8:
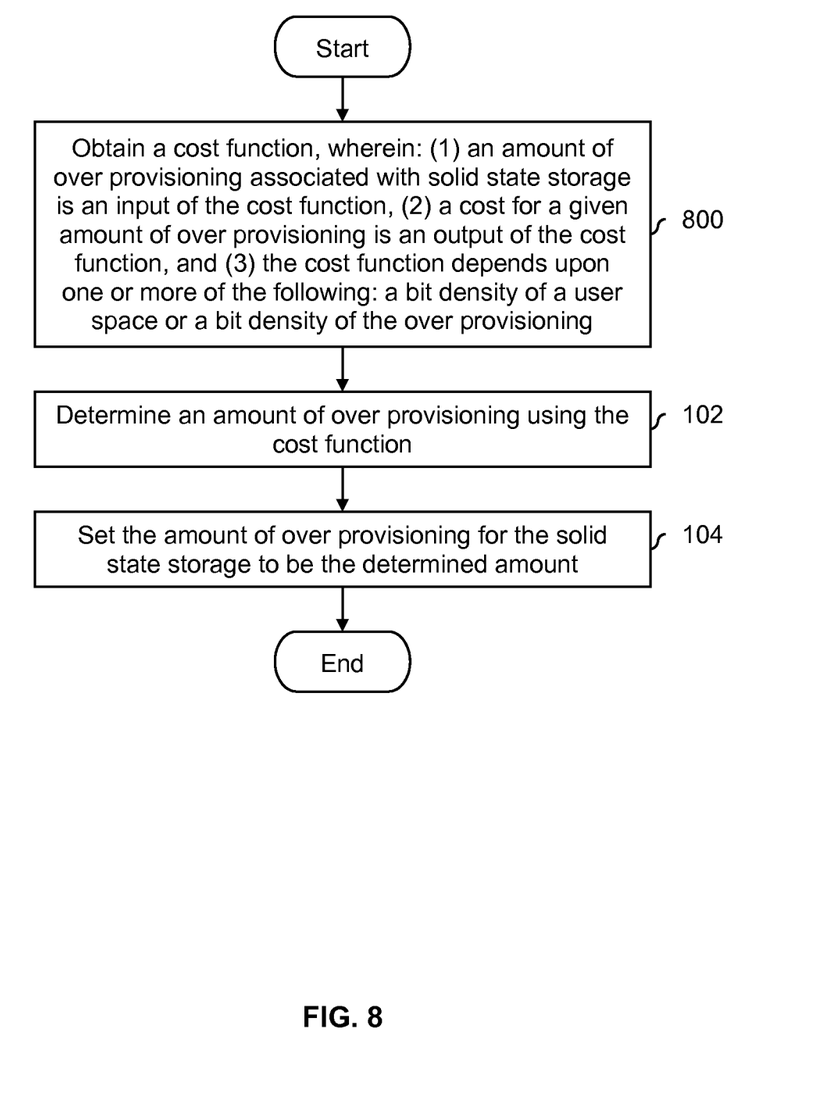
FIG. 8 is a flowchart illustrating an embodiment of a process to determine an amount of over-provisioning using a cost function which depends upon one or more bit densities.

In some embodiments, the shape of a cost function may depend upon one or more bit densities. The following figure shows an example of this.

FIG. 8 is a flowchart illustrating an embodiment of a process to determine an amount of over-provisioning using a cost function which depends upon one or more bit densities. FIG. 8 is similar to FIG. 1 and the same reference numbers are used where steps are identical.

At 800, a cost function is obtained, wherein: (1) an amount of over-provisioning associated with solid state storage is an input of the cost function, (2) a cost for a given amount of over-provisioning is an output of the cost function, and (3) the cost function depends upon one or more of the following: a bit density of a user space or a bit density of the over-provisioning.

In FIG. 4, the exemplary cost function shown in diagram 400 assumes that the bit density of the user space and the spare space is the same (e.g., both are SLC, both are MLC, etc.). As described above, in some embodiments, the user space and spare space have bit densities. In a simple example (for the purposes of explanation), the spare space is always wholly SLC (e.g., because it includes a cache which needs a faster response time) and the user space is always wholly MLC. For such a configuration, the slope of the cost function would be twice as steep as that shown in FIG. 4. This is because adding a block to the user space would add (1 bit per cell×<number of cells per block>) to the spare space but would take away (2 bits per cell×<number of cells per block>) from the user space. To put it more generally, in some embodiments, a cost function takes into account bit density, the bit density of the user space and/or the bit density of the spare space.

At 102, an amount of over-provisioning is determined using the cost function. At 104, the amount of over-provisioning for the solid state storage is set to be the determined amount.

Naturally, the techniques shown here may be used in combination with other techniques described above (e.g., FIG. 6 or FIG. 7).

The following figures describe various examples of a technique for determining an amount of over-provisioning using a threshold amount of over-provisioning at an age of interest. In the examples described above, the age of interest is the end of life for the solid state storage drive or media.

Figure 9:
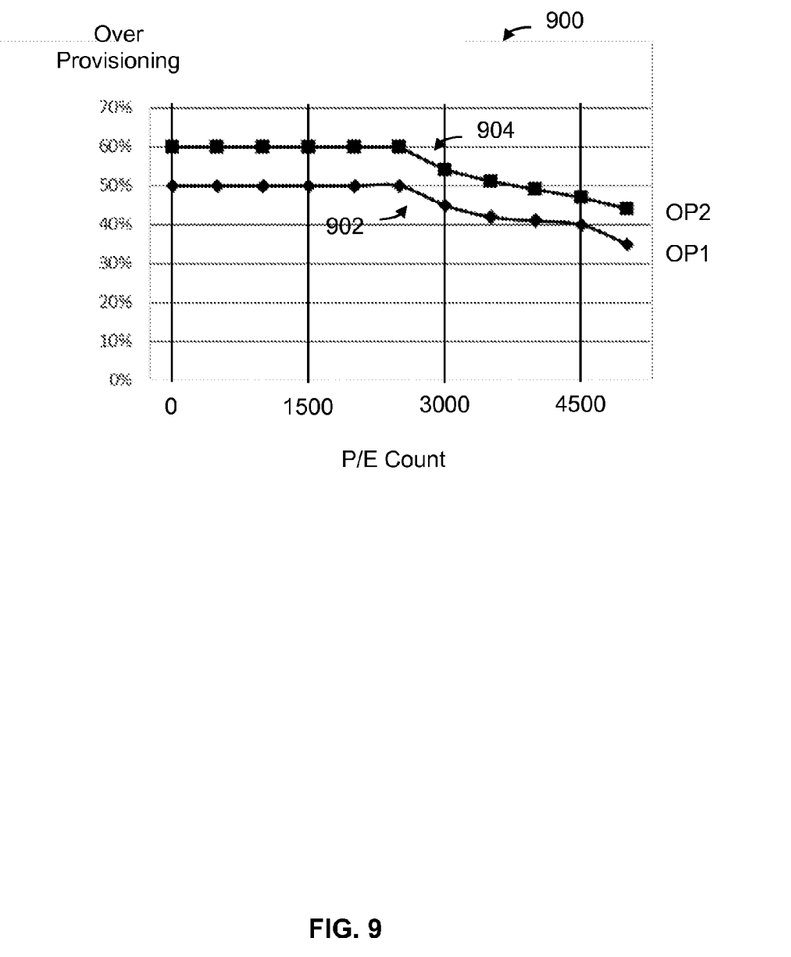
FIG. 9 is a diagram illustrating two embodiments of over-provisioning functions as a function of program and erase count.

FIG. 9 is a diagram illustrating two embodiments of over-provisioning functions as a function of program and erase count. Diagram 900 shows two over-provisioning functions: OP1 (902) and OP2 (904). OP1 (902) corresponds to an initial over-provisioning of 50% and OP2 (904) corresponds to an initial over-provisioning of 60%. As the program and erase (P/E) count (i.e., amount of wear or age) increases, the amount of over-provisioning decreases. This is because program and erase operations are very stressful to solid state storage cells and they gradually break down the electrical insulation of cells, making them "leaky" with respect to charge.

For readability, the data points that comprise the exemplary over-provisioning functions shown in diagram 900 are shown in the table below.

TABLE 4

Data points in exemplary over-provisioning function (FIG. 9).

| P/E Count | Over-provisioning (OP1) | Over-provisioning (OP2) |
|---|---|---|
| 0 | 50% | 60% |
| 500 | 50% | 60% |
| 1,000 | 50% | 60% |
| 1,500 | 50% | 60% |
| 2,000 | 50% | 60% |
| 2,500 | 50% | 60% |
| 3,000 | 45% | 54% |
| 3,500 | 42% | 51% |
| 4,000 | 41% | 49% |
| 4,500 | 40% | 47% |
| 5,000 | 35% | 44% |

Figure 10:
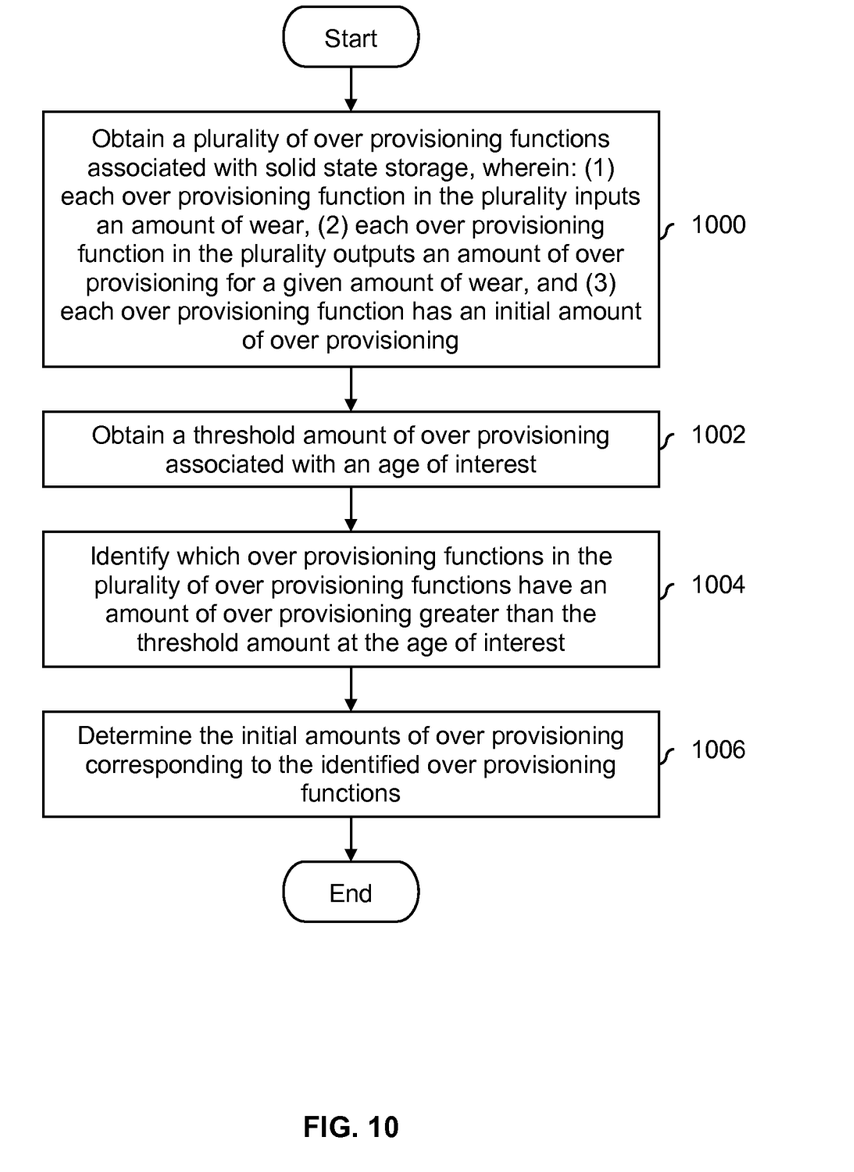
FIG. 10 is a diagram illustrating an embodiment of a process to determine an amount of over-provisioning based at least in part on a threshold amount of over-provisioning at an age of interest.

It may be desirable at the end of life to have at least some minimum amount of over-provisioning. For example, if there is not enough over-provisioning, then response times to host access requests may be delayed because the system has to perform garbage collection, which delays the read or write request from the host. The following figure describes a process in which a threshold amount of over-provisioning, at a particular age of interest, is used to determine an amount of over-provisioning.

FIG. 10 is a diagram illustrating an embodiment of a process to determine an amount of over-provisioning based at least in part on a threshold amount of over-provisioning at an age of interest.

At 1000, a plurality of over-provisioning functions is obtained, wherein: (1) each over-provisioning function in the plurality inputs an amount of wear, (2) each over-provisioning function in the plurality outputs an amount of over-provisioning for a given amount of wear, and (3) each over-provisioning function has an initial amount of over-provisioning. See, for example, the over-provisioning functions shown in FIG. 9.

At 1002, a threshold amount of over-provisioning associated with an age of interest is obtained. For example, the age of interest may be expressed in terms of P/E count. In one example, the P/E count of interest is 5,000 P/E cycles and the threshold amount of over-provisioning at that P/E count is 40%.

At 1004, which over-provisioning functions in the plurality of over-provisioning functions have an amount of over-provisioning greater than the threshold amount at the age of interest are identified. For example, per Table 4, at a P/E count of 5000, the first over-provisioning function (OP1) has an over-provisioning value of 35% and the second over-provisioning function (OP2) has an over-provisioning value of 44%. In this example, only the second over-provisioning function satisfies the test.

At 1006, the initial amounts of over-provisioning corresponding to the identified over-provisioning functions are determined. To continue the example from above, the second over-provisioning function (OP2) has an initial over-provisioning of 60%. The spare space may then be sized or configured accordingly using the initial amount of overprovisioning (e.g., 60%) found at step 1006.

In some embodiments, the process of FIG. 7 is combined with the process of FIG. 10. For example, at step 706 in FIG. 7, a range of acceptable amounts of over-provisioning is determined and at step 708, one of those amounts is selected. In some embodiments, the process of FIG. 10 is used to select one of the acceptable amounts of over-provisioning from step 708 in FIG. 7. To continue the example from above, over-provisioning functions which start out at 40%, 50%, 60%, 70%, and 80% would be processed according to FIG. 10 in order to select one of the acceptable amounts of over-provisioning. That is, in some embodiments, step 708 in FIG. 7 includes the process of FIG. 10. Conversely, in some embodiments, the process of FIG. 10 is used independently of the process in FIG. 7.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
obtain a cost function, wherein an amount of over-provisioning associated with solid state storage is an input of the cost function and a cost for a given amount of over-provisioning is an output of the cost function;
obtain a write amplification function, wherein the amount of over-provisioning associated with the solid state storage is an input of the write amplification function and an amount of write amplification for the given amount of over-provisioning is an output of the write amplification function;
determine an amount of over-provisioning by combining the cost function and the write amplification function in order to obtain a combined function, and finding a minimum of the combined function; and
set the amount of over-provisioning for the solid state storage to be the determined amount.

2. The system recited in claim 1, wherein the solid state storage includes spare space and user space.

3. The system recited in claim 2, wherein:
the spare space includes a cache that includes one or more single-level cells (SLC); and
the user space includes one or more multi-level cells (MLC).

4. The system recited in claim 1, wherein determining the amount of over-provisioning further includes:
  determining a threshold using the minimum of the combined function;
  determining a range of acceptable amounts of over-provisioning, including by determining amounts of over-provisioning which correspond to a combined cost and write amplification less than the threshold; and
  selecting one of the amounts of over-provisioning from the range of acceptable amounts.

5. The system recited in claim 4, wherein selecting one of the amounts of over-provisioning from the range of acceptable amounts includes:
  obtaining a plurality of over-provisioning functions, wherein:
    each over-provisioning function in the plurality inputs an amount of wear;
    each over-provisioning function in the plurality outputs an amount of over-provisioning for a given amount of wear; and
    each over-provisioning function has an initial amount of over-provisioning;
  obtaining a threshold amount of over-provisioning associated with an age of interest;
  identifying which over-provisioning functions in the plurality of over-provisioning functions have an amount of over-provisioning greater than the threshold amount at the age of interest; and
  determining the initial amounts of over-provisioning corresponding to the identified over-provisioning functions.

6. The system recited in claim 1, wherein the cost function depends upon one or more of the following: a bit density of a user space or a bit density of the over-provisioning.

7. A system, comprising:
  a processor; and
  a memory coupled with the processor, wherein the memory is configured to provide the processor with instructions which when executed cause the processor to:
    obtain a plurality of over-provisioning functions associated with solid state storage, wherein:
      each over-provisioning function in the plurality inputs an amount of wear;
      each over-provisioning function in the plurality outputs an amount of over-provisioning for a given amount of wear; and
      each over-provisioning function has an initial amount of over-provisioning;
    obtain a threshold amount of over-provisioning associated with an age of interest;
    identify which over-provisioning functions in the plurality of over-provisioning functions have an amount of over-provisioning greater than the threshold amount at the age of interest; and
    determine the initial amounts of over-provisioning corresponding to the identified over-provisioning functions.

8. The system recited in claim 7, wherein the solid state storage includes spare space and user space.

9. The system recited in claim 8, wherein:
  the spare space includes a cache that includes one or more single-level cells (SLC); and
  the user space includes one or more multi-level cells (MLC).

10. A method, comprising:
  obtaining a cost function, wherein an amount of over-provisioning associated with solid state storage is an input of the cost function and a cost for a given amount of over-provisioning is an output of the cost function;
  obtaining a write amplification function, wherein the amount of over-provisioning associated with the solid state storage is an input of the write amplification function and an amount of write amplification for the given amount of over-provisioning is an output of the write amplification function;
  using a processor to determine an amount of over-provisioning by combining the cost function and the write amplification function in order to obtain a combined function, and finding a minimum of the combined function; and
  setting the amount of over-provisioning for the solid state storage to be the determined amount.

11. The method recited in claim 10, wherein the solid state storage includes spare space and user space.

12. The method recited in claim 11, wherein:
  the spare space includes a cache that includes one or more single-level cells (SLC); and
  the user space includes one or more multi-level cells (MLC).

13. The method recited in claim 10, wherein determining the amount of over-provisioning further includes:
  determining a threshold using the minimum of the combined function;
  determining a range of acceptable amounts of over-provisioning, including by determining amounts of over-provisioning which correspond to a combined cost and write amplification less than the threshold; and
  selecting one of the amounts of over-provisioning from the range of acceptable amounts.

14. The method recited in claim 13, wherein selecting one of the amounts of over-provisioning from the range of acceptable amounts includes:
  obtaining a plurality of over-provisioning functions, wherein:
    each over-provisioning function in the plurality inputs an amount of wear;
    each over-provisioning function in the plurality outputs an amount of over-provisioning for a given amount of wear; and
    each over-provisioning function has an initial amount of over-provisioning;
  obtaining a threshold amount of over-provisioning associated with an age of interest;
  identifying which over-provisioning functions in the plurality of over-provisioning functions have an amount of over-provisioning greater than the threshold amount at the age of interest; and
  determining the initial amounts of over-provisioning corresponding to the identified over-provisioning functions.

15. The method recited in claim 10, wherein the cost function depends upon one or more of the following: a bit density of a user space or a bit density of the over-provisioning.

16. A method, comprising:
  obtaining a plurality of over-provisioning functions associated with solid state storage, wherein:
    each over-provisioning function in the plurality inputs an amount of wear;
    each over-provisioning function in the plurality outputs an amount of over-provisioning for a given amount of wear; and each over-provisioning function has an initial amount of over-provisioning;
obtaining a threshold amount of over-provisioning associated with an age of interest;
using a processor to identify which over-provisioning functions in the plurality of over-provisioning functions have an amount of over-provisioning greater than the threshold amount at the age of interest; and
using the processor to determine the initial amounts of over-provisioning corresponding to the identified over-provisioning functions.

17. The method recited in claim 16, wherein the solid state storage includes spare space and user space.

18. The method recited in claim 17, wherein:
the spare space includes a cache that includes one or more single-level cells (SLC); and
the user space includes one or more multi-level cells (MLC).

* * * * *